United States Patent
Katz (10) Patent No.: US 12,546,348 B2
(45) Date of Patent: Feb. 10, 2026

(54) SOLAR PANEL MOUNTING CONFIGURATION

(71) Applicant: Tamarack Solar Products, Inc., Arcata, CA (US)

(72) Inventor: David Katz, Arcata, CA (US)

(73) Assignee: Tamarack Solar Products, Inc., Arcata, CA (US)

( * ) Notice: Subject to any disclaimer, the term of this patent is extended or adjusted under 35 U.S.C. 154(b) by 517 days.

(21) Appl. No.: 18/065,489

(22) Filed: Dec. 13, 2022

(65) Prior Publication Data

US 2023/0184276 A1    Jun. 15, 2023

Related U.S. Application Data

(60) Provisional application No. 63/289,075, filed on Dec. 13, 2021.

(51) Int. Cl.
*F16B 5/02*    (2006.01)
*H02S 20/23*    (2014.01)

(52) U.S. Cl.
CPC ............... *F16B 5/02* (2013.01); *H02S 20/23* (2014.12)

(58) Field of Classification Search
CPC .... F16B 9/02; F16B 9/05; F16B 9/054; F16B 9/056; F16B 9/058; F24S 2025/021; Y02B 10/10; E04B 1/66; E04B 2001/389; E04H 12/2261; Y10T 403/46; H02S 20/23
USPC ....... 52/58, 173.3, 302.6; 248/237; 403/240, 403/258
See application file for complete search history.

(56) References Cited

U.S. PATENT DOCUMENTS

| | | | |
|---|---|---|---|
| 3,071,350 A | 1/1963 | Opie | |
| 3,136,530 A | 6/1964 | Case | |
| 3,483,910 A | 12/1969 | LaLonde et al. | |
| 3,842,564 A | 10/1974 | Brown | |
| 4,073,113 A | 2/1978 | Oudot et al. | |
| 4,159,758 A | 7/1979 | Courson | |

(Continued)

FOREIGN PATENT DOCUMENTS

WO    WO 2017/019971 A1    2/2017

OTHER PUBLICATIONS

U.S. Appl. No. 16/117,813, "Solar Panel Mounting Configuration", Unpublished (filed Aug. 30, 2018), David Katz (Inventor), Tamarack Solar Products, Inc. (Applicant).

*Primary Examiner* — Amber R Anderson
*Assistant Examiner* — Zachary A Hall
(74) *Attorney, Agent, or Firm* — Alston & Bird LLP (57) ABSTRACT

A solar panel mounting configuration comprises a flashing component that at least partially contours to a support surface, an adapter base, and a mounting foot. The flashing component defines a domed portion having an open interior surface accessible via a bottom surface of the flashing component. The adapter base is configured to fit within the domed portion and defines a plurality of apertures. A central aperture is configured to accept a fastener extending through the adapter foot, through a flashing aperture, and the central aperture of the adapter foot. The fastener may extend into the support surface. Alternatively, a plurality of fasteners may extend through peripheral apertures of the plurality of apertures of the adapter base, and a separate fastener may extend through the central aperture to secure the mounting foot relative to the adapter base.

13 Claims, 10 Drawing Sheets

(56) References Cited

U.S. PATENT DOCUMENTS

| | | |
|---|---|---|
| 4,369,953 A | 1/1983 | Greiner et al. |
| 4,410,298 A | 10/1983 | Kowalski |
| 4,645,393 A | 2/1987 | Pletcher |
| 4,953,820 A | 9/1990 | Yoder |
| 5,186,314 A | 2/1993 | Clopton |
| 5,209,619 A | 5/1993 | Rinderer |
| 5,628,598 A | 5/1997 | Hofle |
| 5,938,184 A | 8/1999 | DeSouza |
| 6,672,018 B2 | 1/2004 | Shingleton |
| 6,758,625 B1* | 7/2004 | Lawrence ............ E06B 3/5436 403/388 |
| 6,959,517 B2 | 11/2005 | Poddany et al. |
| 7,406,800 B2 | 8/2008 | Cinnamon et al. |
| 7,592,537 B1 | 9/2009 | West |
| 7,634,875 B2 | 12/2009 | Genschorek |
| 7,748,175 B2 | 7/2010 | Liebendorfer |
| 7,814,899 B1 | 10/2010 | Port |
| 7,992,841 B2 | 8/2011 | Petta et al. |
| 8,051,976 B2 | 11/2011 | Koeda et al. |
| 8,122,648 B1* | 2/2012 | Liu ......................... F24S 25/61 52/173.3 |
| 8,128,044 B2 | 3/2012 | Liebendorfer |
| 8,181,926 B2 | 5/2012 | Magno, Jr. et al. |
| 8,250,829 B2 | 8/2012 | McPheeters et al. |
| 8,356,446 B2 | 1/2013 | Takeda et al. |
| 8,387,319 B1 | 3/2013 | Gilles-Gagnon et al. |
| 8,413,944 B2 | 4/2013 | Harberts et al. |
| 8,418,688 B2 | 4/2013 | King et al. |
| 8,539,719 B2 | 9/2013 | McPheeters et al. |
| 8,567,030 B2 | 10/2013 | Koch et al. |
| 8,595,996 B2 | 12/2013 | Korman et al. |
| 8,595,997 B2 | 12/2013 | Wu |
| 8,640,401 B2 | 2/2014 | Hong et al. |
| 8,695,290 B1 | 4/2014 | Kim et al. |
| 8,733,718 B2* | 5/2014 | Corsi ................... F24S 25/617 52/27 |
| 8,813,460 B2 | 8/2014 | Cinnamon et al. |
| 8,839,575 B1 | 9/2014 | Liu et al. |
| 8,984,818 B2 | 3/2015 | McPheeters et al. |
| 9,080,792 B2 | 7/2015 | Patton et al. |
| 9,097,443 B2 | 8/2015 | Liu et al. |
| 9,147,986 B2 | 9/2015 | Redel |
| 9,160,273 B2 | 10/2015 | Schuit et al. |
| 9,175,881 B2 | 11/2015 | Schrock et al. |
| 9,243,817 B2 | 1/2016 | West et al. |
| 9,249,813 B2 | 2/2016 | Kalman |
| 9,347,213 B1 | 5/2016 | Zhang et al. |
| 9,453,592 B2 | 9/2016 | Zhang et al. |
| 9,506,600 B1 | 11/2016 | Li |
| 9,577,571 B2 | 2/2017 | Atia et al. |
| 9,584,062 B2 | 2/2017 | Ganshaw et al. |
| 9,638,223 B2 | 5/2017 | Redel |
| 9,660,567 B2 | 5/2017 | Goehringer et al. |
| 9,813,013 B2 | 11/2017 | McPheeters et al. |
| 9,813,015 B1 | 11/2017 | Kapla et al. |
| 9,819,303 B2 | 11/2017 | Ash |
| 9,825,581 B2 | 11/2017 | Wildes |
| 9,853,593 B2 | 12/2017 | Cinnamon et al. |
| 9,893,677 B1 | 2/2018 | Liu |
| 9,923,511 B2 | 3/2018 | Xie |
| 9,954,479 B1 | 4/2018 | Atia et al. |
| 9,973,142 B2 | 5/2018 | Stearns |
| 10,090,800 B2 | 10/2018 | McPheeters et al. |
| 10,097,133 B2 | 10/2018 | Aliabadi et al. |
| 10,177,704 B2 | 1/2019 | Kapla et al. |
| 10,205,418 B2 | 2/2019 | Nayar |
| 10,205,419 B2 | 2/2019 | McPheeters et al. |
| 10,218,305 B1 | 2/2019 | Schrock |
| 10,218,306 B1 | 2/2019 | Ash et al. |
| 10,236,821 B2 | 3/2019 | Atia et al. |
| 10,302,333 B2 | 5/2019 | McPheeters et al. |
| 10,330,249 B1 | 6/2019 | Polen |
| 10,340,838 B2 | 7/2019 | Schuit et al. |
| 10,622,935 B1 | 4/2020 | Liu |
| 10,663,195 B2 | 5/2020 | Ash et al. |
| 11,221,034 B1 | 1/2022 | Katz |
| 11,296,648 B1 | 4/2022 | Jasmin et al. |
| 11,377,840 B2 | 7/2022 | Stephan et al. |
| 11,384,780 B2 | 7/2022 | Katz |
| 11,757,400 B1 | 9/2023 | Jasmin et al. |
| 2005/0095062 A1 | 5/2005 | Iverson et al. |
| 2005/0257453 A1 | 11/2005 | Cinnamon |
| 2008/0244881 A1 | 10/2008 | Zante |
| 2008/0310913 A1 | 12/2008 | Urban et al. |
| 2009/0232616 A1 | 9/2009 | Sekreta et al. |
| 2010/0229367 A1 | 9/2010 | Franklin |
| 2010/0269447 A1 | 10/2010 | Schuit et al. |
| 2010/0276558 A1 | 11/2010 | Faust et al. |
| 2011/0000544 A1 | 1/2011 | West |
| 2011/0138585 A1 | 6/2011 | Kmita et al. |
| 2011/0179606 A1 | 7/2011 | Magno, Jr. et al. |
| 2011/0233157 A1 | 9/2011 | Kmita |
| 2011/0247295 A1 | 10/2011 | Stearns et al. |
| 2011/0302857 A1 | 12/2011 | McClellan et al. |
| 2012/0001046 A1 | 1/2012 | Schmotz |
| 2012/0097807 A1 | 4/2012 | Rees |
| 2012/0187267 A1 | 7/2012 | Hudson et al. |
| 2012/0193310 A1 | 8/2012 | Fluhrer et al. |
| 2012/0222380 A1* | 9/2012 | Wentworth ............ H02S 20/23 248/237 |
| 2013/0291479 A1 | 11/2013 | Schaefer et al. |
| 2013/0320175 A1 | 12/2013 | Kemple |
| 2014/0026946 A1 | 1/2014 | West et al. |
| 2014/0041202 A1 | 2/2014 | Schnitzer et al. |
| 2014/0110543 A1 | 4/2014 | Aliabadi et al. |
| 2014/0202525 A1 | 7/2014 | Janssens et al. |
| 2014/0255090 A1 | 9/2014 | Oravits et al. |
| 2014/0319307 A1 | 10/2014 | Schrock et al. |
| 2014/0341645 A1 | 11/2014 | Liu et al. |
| 2015/0040967 A1 | 2/2015 | West et al. |
| 2015/0060619 A1 | 3/2015 | Krannich et al. |
| 2015/0068010 A1 | 3/2015 | Klingler |
| 2015/0078806 A1 | 3/2015 | Schrock |
| 2015/0168021 A1 | 6/2015 | Wentworth et al. |
| 2015/0180404 A1 | 6/2015 | Braunstein et al. |
| 2016/0043687 A1 | 2/2016 | McPheeters et al. |
| 2016/0043689 A1 | 2/2016 | McPheeters et al. |
| 2016/0054030 A1 | 2/2016 | Ilzhöfer |
| 2016/0069592 A1 | 3/2016 | Giraudo et al. |
| 2016/0087576 A1 | 3/2016 | Johansen et al. |
| 2016/0111995 A1 | 4/2016 | Nayar |
| 2016/0111999 A1 | 4/2016 | Stapleton |
| 2016/0112000 A1 | 4/2016 | McPheeters |
| 2016/0134230 A1 | 5/2016 | Meine et al. |
| 2016/0285406 A1 | 9/2016 | Nishio et al. |
| 2016/0308486 A1 | 10/2016 | Atia et al. |
| 2016/0344338 A1 | 11/2016 | Schutz et al. |
| 2017/0063301 A1 | 3/2017 | Ash |
| 2017/0302221 A1 | 10/2017 | Jasmin |
| 2017/0353143 A1 | 12/2017 | Stearns et al. |
| 2018/0026577 A1 | 1/2018 | Gaveau et al. |
| 2018/0048261 A1 | 2/2018 | Franklin et al. |
| 2018/0062560 A1* | 3/2018 | Stephan ................. F24S 25/30 |
| 2018/0062571 A1 | 3/2018 | Ash et al. |
| 2018/0076756 A1* | 3/2018 | Stephan ................. H02S 30/10 |
| 2018/0106289 A1 | 4/2018 | Ash et al. |
| 2018/0238359 A1 | 8/2018 | Cross |
| 2018/0238589 A1 | 8/2018 | Ash et al. |
| 2018/0316300 A1 | 11/2018 | Kapla et al. |
| 2018/0323744 A1 | 11/2018 | Hudson |
| 2018/0342974 A1 | 11/2018 | Jasmin et al. |
| 2019/0178274 A1 | 6/2019 | Katz |
| 2020/0014327 A1 | 1/2020 | Rodrigues et al. |
| 2020/0116191 A1 | 4/2020 | Uppu et al. |
| 2021/0102577 A1 | 4/2021 | Kovacs et al. |
| 2022/0345074 A1 | 10/2022 | Neal et al. |
| 2022/0381275 A1 | 12/2022 | Katz |

\* cited by examiner

SOLAR PANEL MOUNTING CONFIGURATION

CROSS-REFERENCE TO RELATED APPLICATIONS

This patent application claims priority to Provisional Patent Appl. Ser. No. 63/289,075, filed Dec. 13, 2021, which is incorporated herein by reference in its entirety.

BACKGROUND

Solar panels, which typically comprise large sheets of glass surrounded by a rigid frame (e.g., aluminum) and two electrical leads extending from each panel that are electrically connected to an electrical storage device (e.g., a battery or inverter). Due to the very nature of solar panels and the mechanism through which they generate electricity, solar panels are often secured to building roofs or other supportive structures where the solar panels are exposed to direct sunlight for a maximum amount of time during each day.

As solar energy becomes an increasingly popular source of electrical power both on and off traditional power grids, the need for installation systems that can be quickly and easily utilized to secure solar panels to respective supportive structures has become increasingly important. Moreover, as these support surfaces can encompass various different types of support surfaces, including different types of tiles, different types of underlying truss-based support surfaces, and/or the like, a need exists for mounting systems that can flexibly be used for mounting devices to different types of supports.

BRIEF SUMMARY

Various embodiments described herein are directed to a solar panel mounting system. In various embodiments, a solar panel mounting system comprises a flashing component configured to at least partially contour to a support surface, wherein the flashing component is a panel comprising: a domed portion defining an open interior accessible via a lower surface of the panel, wherein the interior has an interior height measured between a lower surface of the panel and an upper interior surface of the domed portion; and a flashing aperture extending through a center of the domed portion; an adapter base positioned within the interior of the domed portion, wherein the adapter base has a base height greater than the interior height and wherein the adapter base defines: a central aperture extending at least substantially parallel to the base height, wherein the central aperture is at least substantially aligned with the flashing aperture; and a plurality of peripheral apertures each extending at least substantially parallel to the base height; and a mounting foot having at least one mounting aperture configured to accept a fastener such that the fastener extends through the mounting aperture of the mounting foot, the flashing aperture of the flashing component, and the central aperture of the adapter base, wherein the mounting foot is configured to secure a solar system to the support surface.

In various embodiments, the panel may additionally define one or more raised stiffening ribs. In various embodiments, the panel may additionally define one or more alignment notches within a perimeter edge of the panel. In certain embodiments, the plurality of peripheral apertures may comprise four peripheral apertures spaced equally around the perimeter of the adapter base.

In various embodiments, the adapter base may define a top surface and a bottom surface, and the adapter base may further define a hexagonal recess aligned with the central aperture, wherein the hexagonal recess is configured to accept a nut securably attached to the fastener to secure the mounting foot onto the adapter base. In certain embodiments, the adapter base may further define a circular recess within the top surface of the adapter base and surrounding the central aperture, wherein the circular recess is configured to accept an O-ring therein. Further, in certain embodiments, the fastener may be a first fastener having a first fastener head positioned within the hexagonal recess, and the solar panel mounting system may additionally comprise a plurality of second fasteners extending through one of more of the plurality of peripheral apertures to secure the adapter base onto the support surface. In certain embodiments, the adapter base may define a secondary recess in the top surface surrounding each of the plurality of peripheral apertures, and each of the second fasteners may have second fastener heads positioned within the secondary recess surrounding each of the one or more of the plurality of peripheral apertures.

In various embodiments, the mounting foot may be an L-shaped foot. Further, in various embodiments, the mounting foot may be a tubular standoff. In certain embodiments, the mounting aperture of the mounting foot may be threaded. In various embodiments, the flashing component may be aluminum. Further, in various embodiments, the adapter base may be aluminum.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

It should be understood that the terms of direction provided within this disclosure are provided merely for purposes of convenience relative to the orientation of the configurations shown in the attached figures. Accordingly, while the terms "vertical" and "horizontal" are provided in reference to the example orientations of the various configurations shown in the Figures, it should be understood that these directions are provided merely to ease the discussion of the functionality of the described configurations, however it should be understood that the described configurations may be provided in any orientation. Indeed, the described solar panel mounting configurations may be utilized to mount solar panels relative to supportive structures configured at any angle relative to horizontal. For example, the described configurations may be secured relative to entirely horizontal building roofs, pitched building roofs between 0-90 degrees, or entirely vertical building walls, as non-limiting examples.

Various embodiments are directed to mounting systems for securing solar panels relative to supportive structures (e.g., roofs, decks, and/or the like). The mounting systems discussed herein may be configured to secure rail-based mounting systems (or other mounting systems that secure directly or indirectly to solar panels) to the supportive structure.

Figure 1:
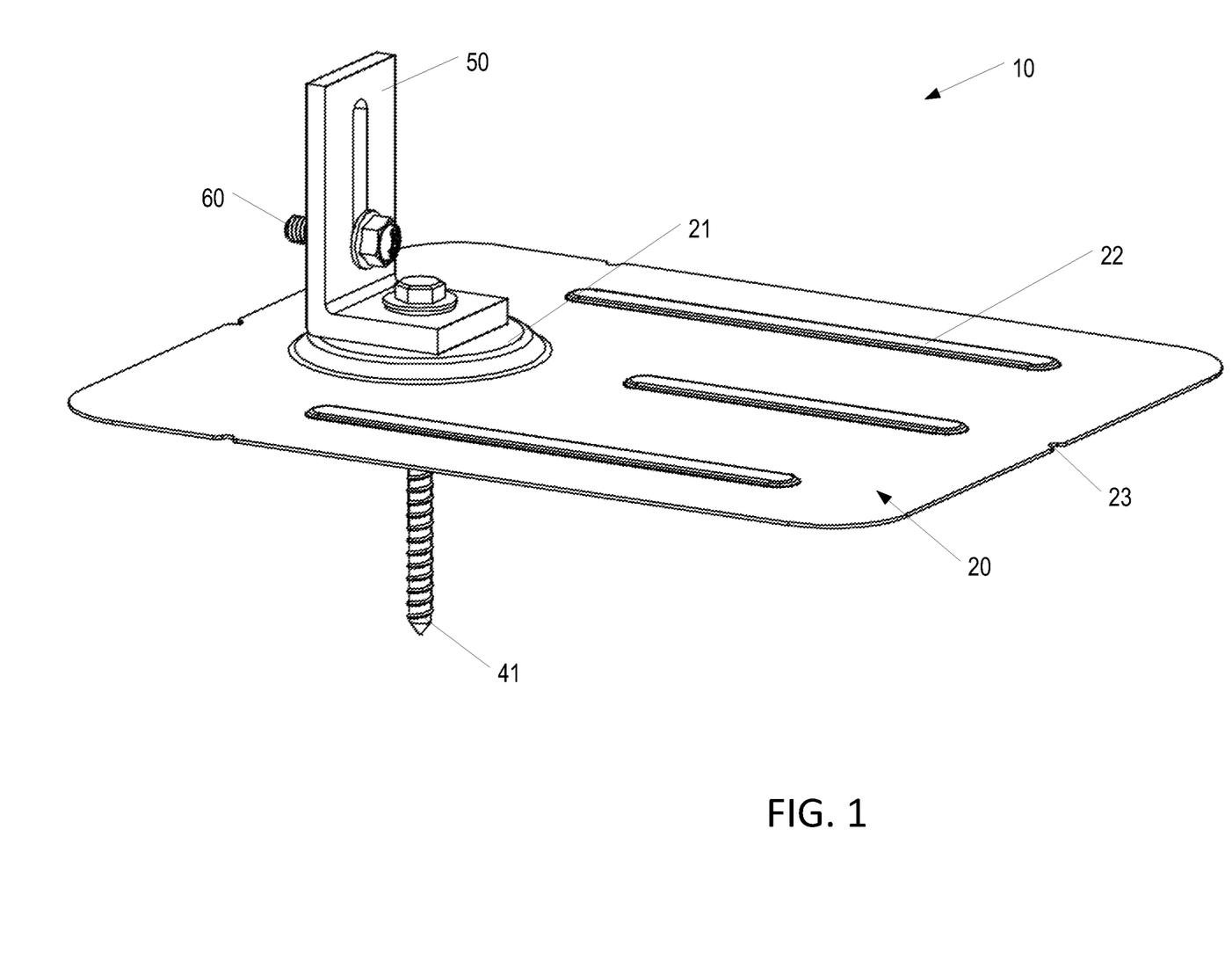
FIG. 1 shows a perspective view of a solar panel mounting system configured with a single fastener.
Figure 6:
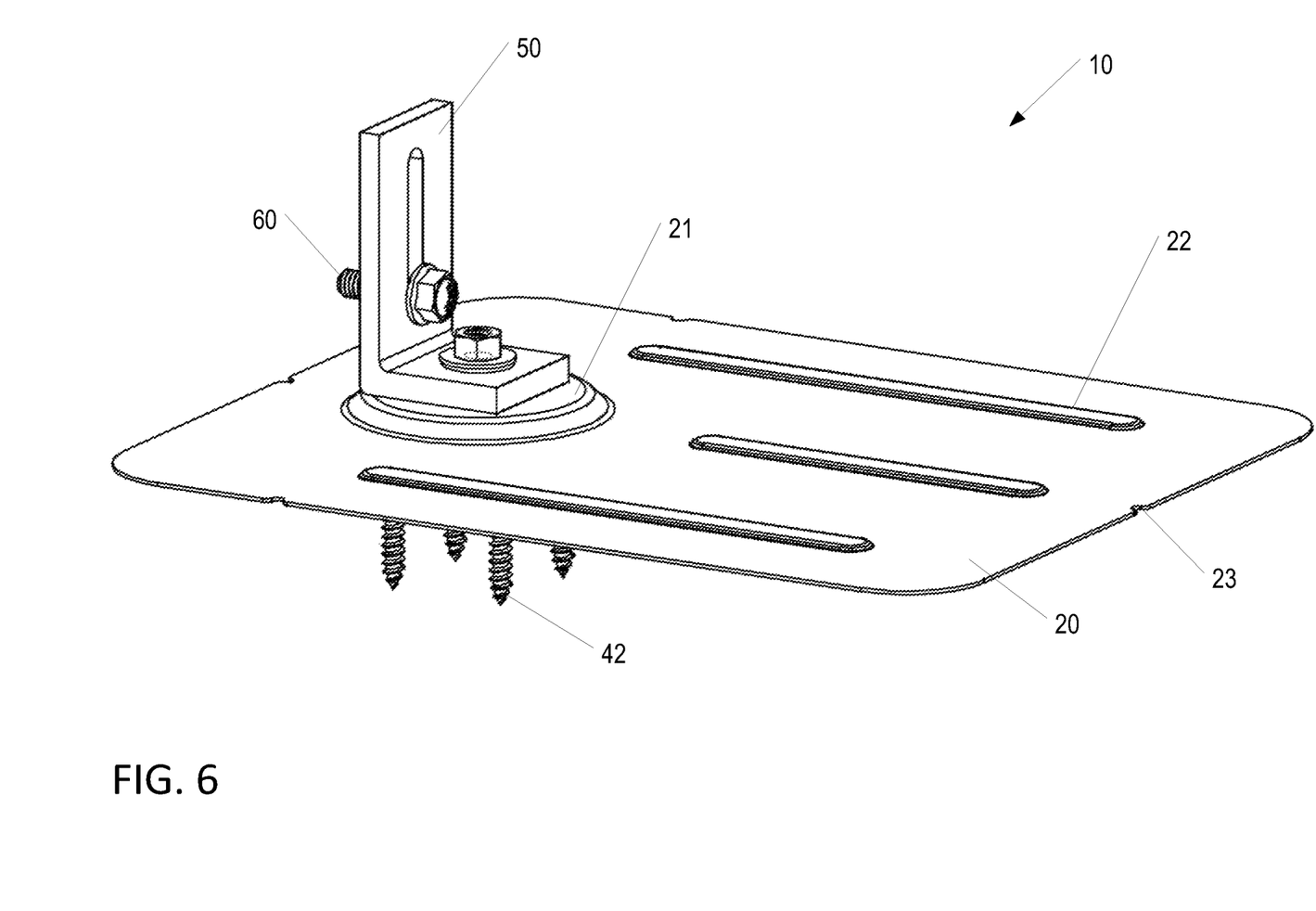
FIG. 6 shows a perspective view of a solar panel mounting system configured with multiple fasteners.
Figure 7:
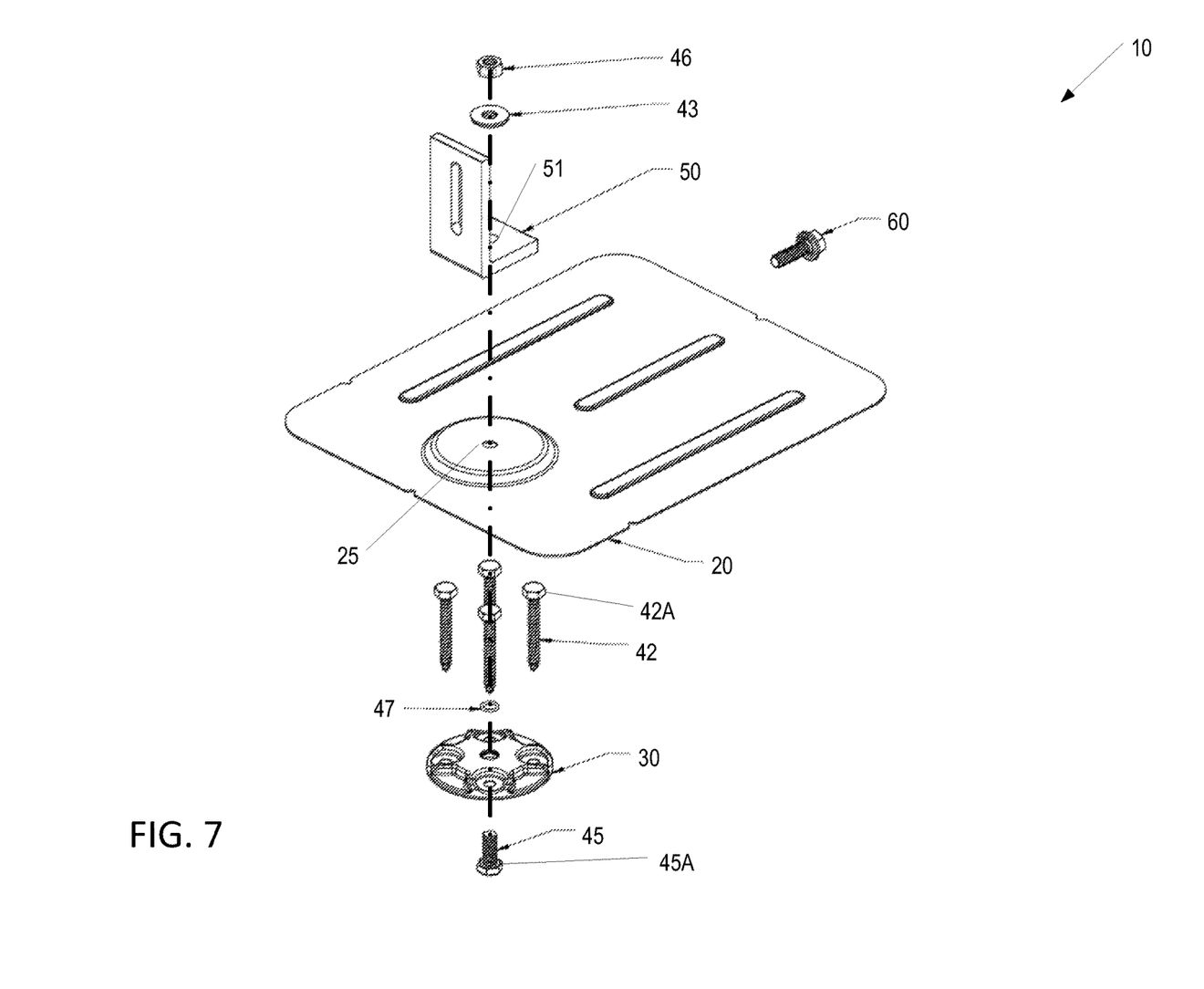
FIG. 7 is an exploded view of the solar panel mounting system of FIG. 6.
Figure 8:
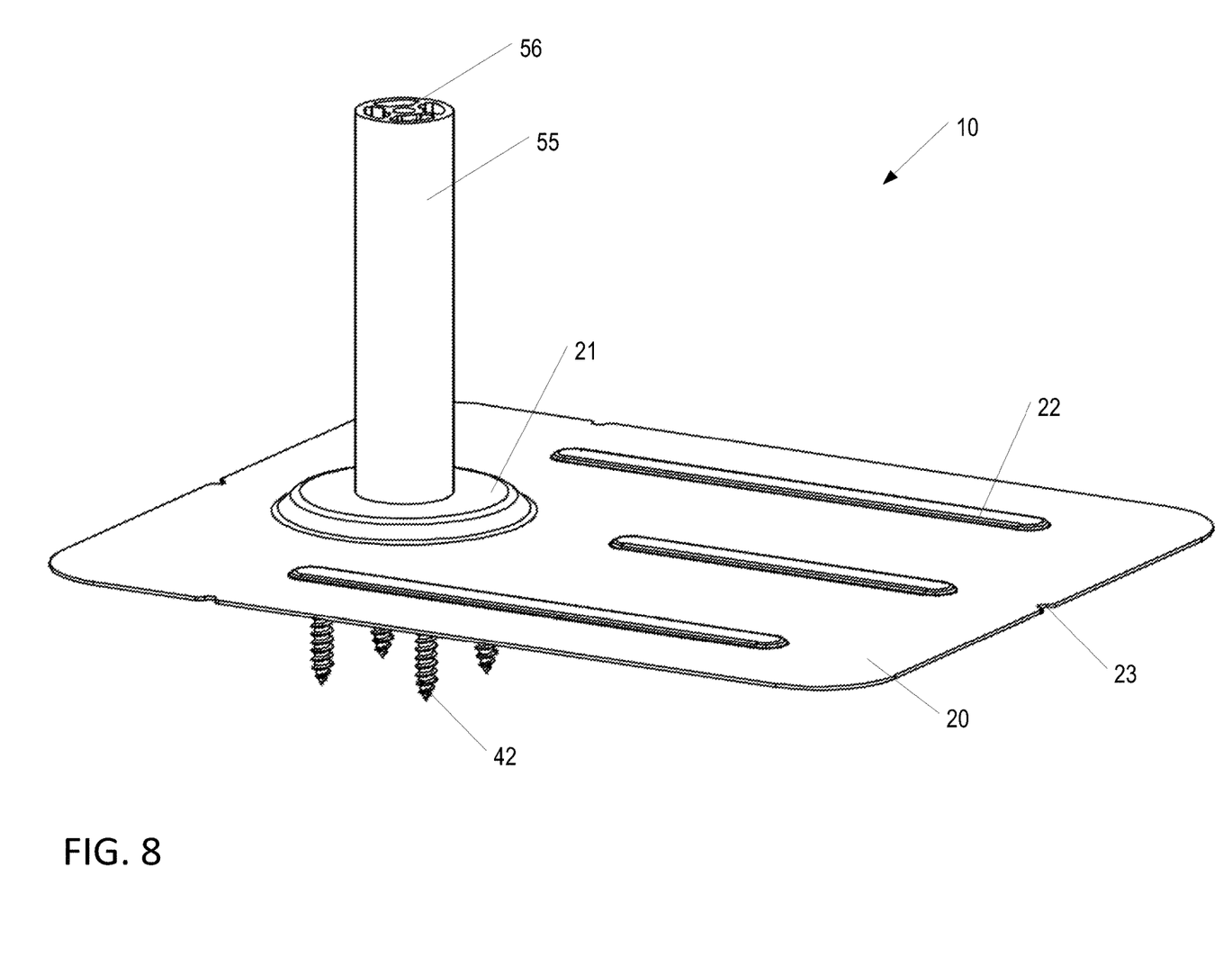
FIG. 8 shows a perspective view of a solar panel mounting system having an alternative mounting foot.
Figure 9:
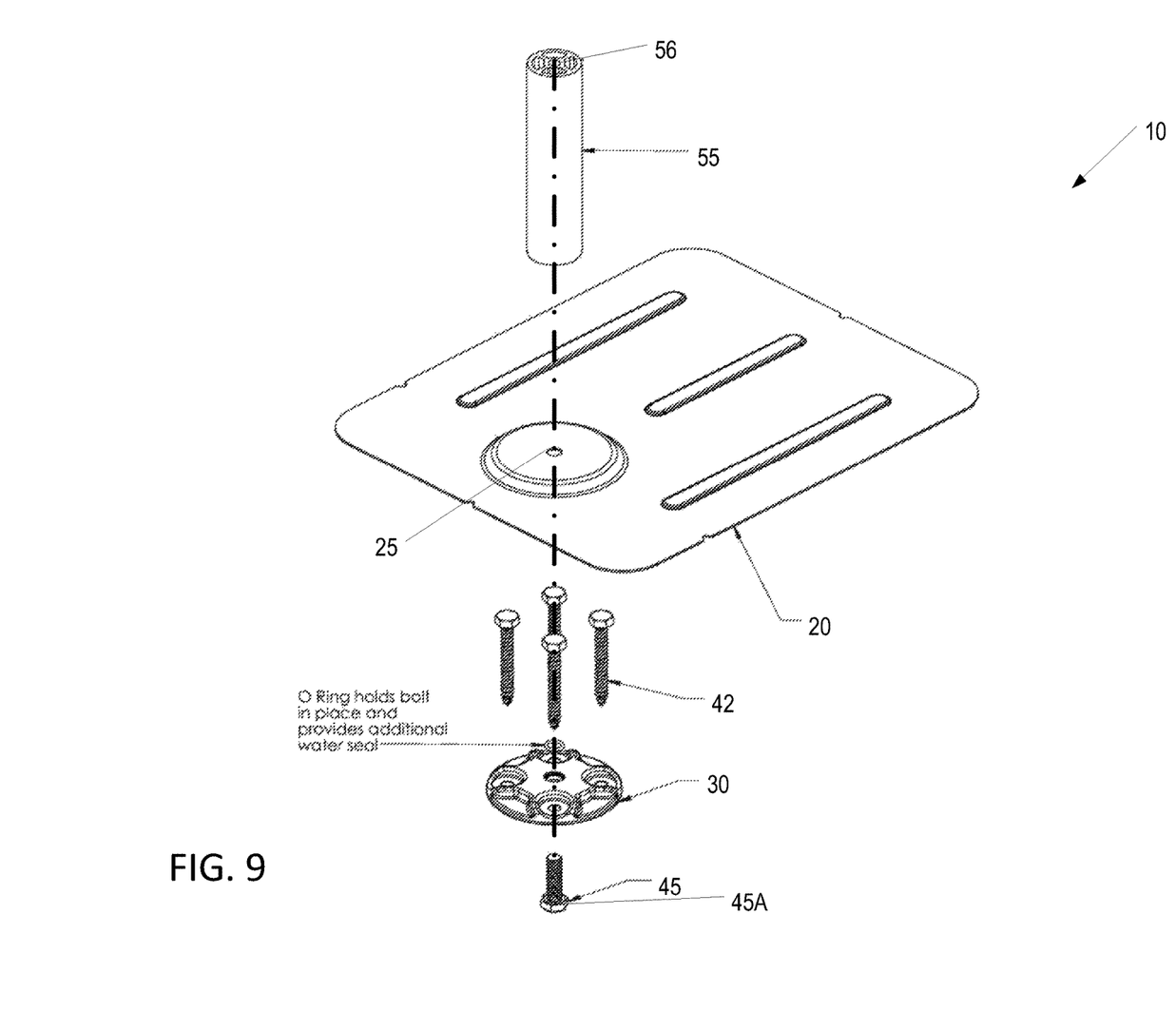
FIG. 9 is an exploded view of the solar panel mounting system of FIG. 8.

FIG. 1 illustrates a mounting system 10 according to one embodiment. It should be understood that certain components are interchangeable within the mounting system 10. For example and with reference to additional figures, a mounting foot may be embodied as an L-shaped mounting foot 50 as illustrated in FIGS. 1, 5, 6, and 7 (which may secure additional components via fastener 60). The mounting foot may alternatively be embodied as a spacer 55 as shown in FIGS. 8-9. As discussed in greater detail herein, an L-shaped mounting foot 50 may be secured onto a top end 56 of a spacer 55.

Other components may be interchangeable, including the fasteners utilized to secure the mounting system 10 to the support surface 100. Again, with reference to several illustrated figures, a single fastener 41 may be utilized to secure the mounting system onto a support surface 100 and/or an underlying support structure 101, 102. As shown in FIGS. 1, 4E, and 5, the fastener 41 extends through all of the mounting foot 50, the flashing component 20, the adapter base 30, and into the support surface 100. Alternatively, a plurality of fasteners 42 (e.g., 2 fasteners 42 or 4 fasteners 42) may extend through the adapter base 30 and into the support surface 100, as shown in FIGS. 4F, 4G, and 6-9. As illustrated in those figures, a separate fastener 45 secures the adapter base 30 onto the flashing component 20 and mounting foot.

With reference to the specific components illustrated in the figures, a mounting system 10 may comprise a flashing component 20 configured to engage a support surface 100 of a support surface to which a solar panel is to be secured, a mounting foot (e.g., L-shaped mounting foot 50 and/or spacer 55) configured to engage at least a portion of a solar panel (e.g., or a mount adapter connected thereto) to facilitate the mounting of the solar panel relative to the flashing component 20, and an adapter base 30 configured to be fastened against the support surface 100 to facilitate the mounting of the flashing component 20 and the mounting foot 50, 55 relative to the support surface 100. In various embodiments, the mounting foot may comprise an L-shaped mounting foot 50 or any of a variety of mounting foot styles may be utilized to operatively connect a solar panel relative to the flashing component, as described herein, including composition roof mounts, standoff mounts, metal roof mounts, tile roof hooks, tile replacement mounts, and/or the like. A spacer 55 is illustrated in FIGS. 8-9 as another example.

In various embodiments, the flashing component 20 may comprise an at least partially planar portion configured to be secured relative to a support surface 100 so as to engage an at least substantially rigid portion thereof, such as, for example, a roof shingle. In certain embodiments, the at least partially planar portion defines one or more stiffening ribs 22 configured to maintain an at least substantially planar shape of the at least partially planar portion. These stiffening ribs 22, as shown in the figures, run at least substantially parallel to a length of the at least partially planar portion, and are positioned to be mounted uphill of the domed portion 21. Uphill, as used herein, refers to a position above the domed portion 21 when mounted on a non-horizontal support surface 100. These stiffening ribs 22 additionally facilitate water flow along the length of the flashing component 20 and around the domed portion 21 to impede water entry into a flashing aperture 25 of the flashing component 20. Moreover, as illustrated in the figures, the flashing component 20 of certain embodiment may additionally comprise one or more alignment notches 23 provided at a perimeter edge of the flashing component 20. These alignment notches may be aligned with the flashing aperture 25 to assist installers with installing the mounting system 10 onto the support surface 100, for example, such that a plurality of mounting systems 10 may be aligned relative to one another and/or the support surface 100.

In certain embodiments, the flashing component 20 may be a metal material (e.g., aluminum, galvanized steel, and/or the like). In certain embodiments, the at least partially planar portion may be rigid or semi-rigid, such that the at least partially planar portion may be bent to at least partially contour to the shape of the support surface 100.

Figure 2A:
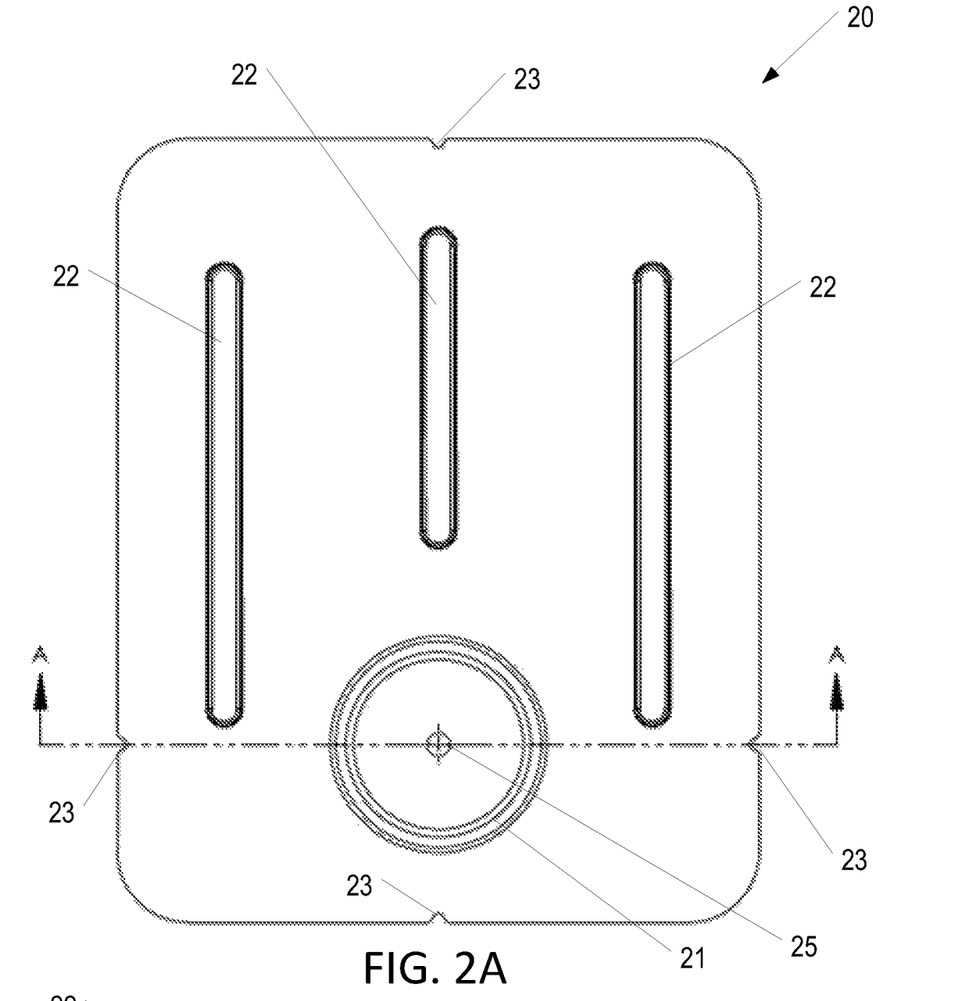
FIGS. 2A-2B show views of a flashing component.

The flashing component 20 may define a flashing aperture 25 extending through a top surface and bottom surface thereof through which the flashing component 20 may receive a fastener (e.g., fastener 41 or fastener 45) to secure the flashing component 20 relative to a mounting foot 50, 55, an adapter base 30, and/or the support surface 100. The flashing component 20 may define a domed portion 21 extending from the top surface thereof in an at least substantially upward direction so as to embody a concave dome portion defining an interior portion that is accessible via the bottom surface of the flashing component 20 as shown in FIG. 2A and the section-view of FIG. 2B, which shows a side view of the flashing component 20, taken along section line A-A of FIG. 2A.

The flashing aperture 25 of the flashing component 20 may extend through the domed portion 21. For example, the domed portion 21 of the flashing component 20 may be configured to facilitate a water shedding functionality of the mounting system, such as, for example, by causing a volume of water traveling along a length of the flashing component 20 (downward along a support surface 100, such as an angled roof) to be redirected away from the flashing aperture 25. Moreover, as shown in the illustrated embodiments, the domed portion 21 may be at least substantially circular and the flashing aperture 25 may be at least substantially concentric with the domed portion 21. As an alternative embodiment, the domed portion 21 may be any shape and the flashing aperture 25 may be located at least substantially centrally within the domed portion 21. In such alternative embodiments, the adapter base 30 has a shape at least substantially matching the shape of the domed portion 21, such that the adapter base 30 fits within the interior portion formed by the domed portion 21.

Figures 3A, 3B:
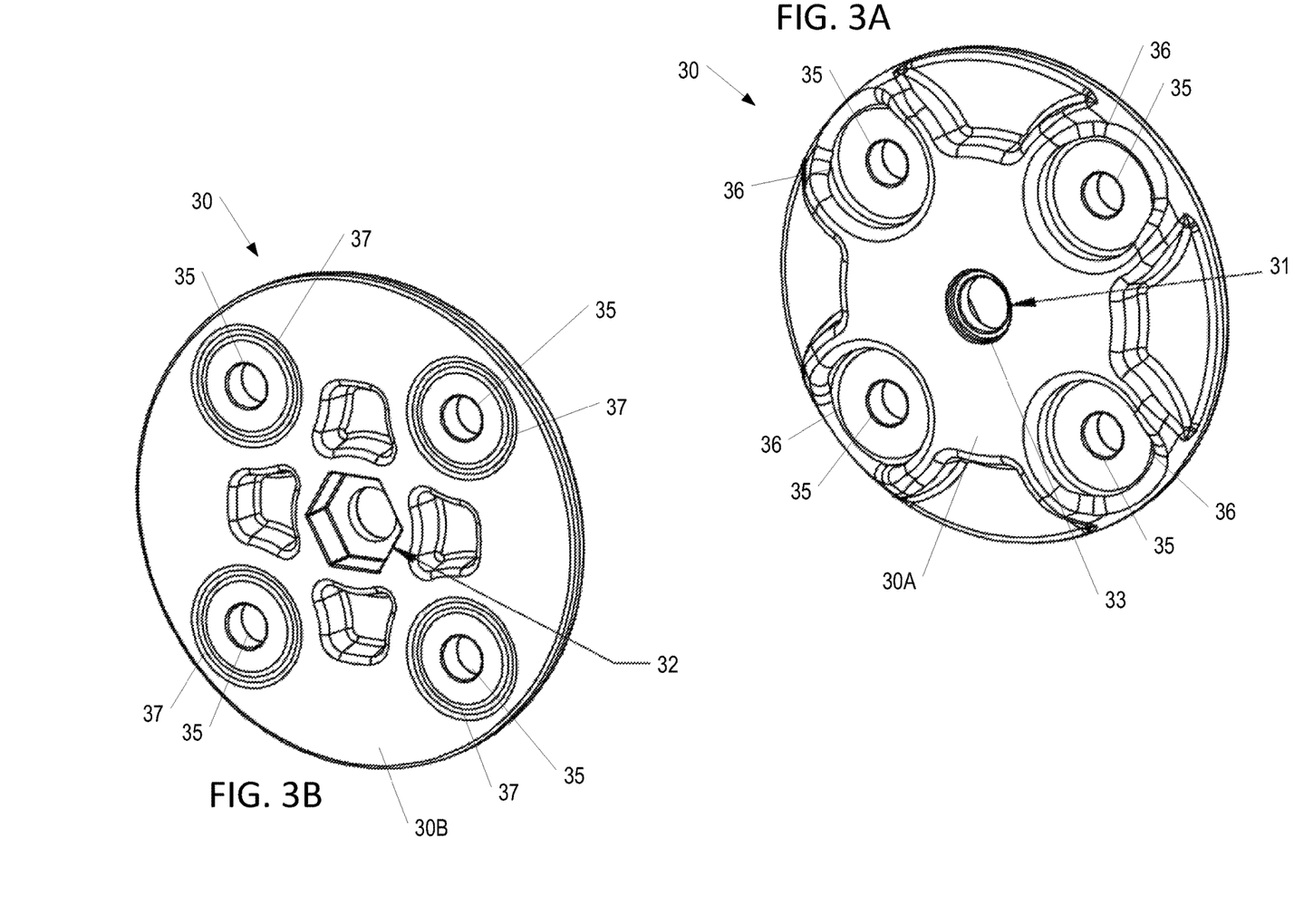
FIGS. 3A-3B show perspective views of an adapter base.

FIGS. 3A-3B illustrate perspective views of an adapter base 30 according to certain embodiments. It should be understood that the adapter base 30 may comprise a metal material (e.g., aluminum, galvanized steel, and/or the like), a polymer material, a reinforced polymer material, and/or the like.

FIGS. 4A-4D illustrate top views of the adapter base 30, illustrating the usage of various mounting holes of the adapter base 30 for securing the adapter base 30 onto a support surface 100, depending on the underlying support structure 101, 102 of the support surface 100. FIGS. 4E-4G illustrate side views of the adapter base 30 in use within a mounting system 10 with various combinations of fasteners, as necessary to secure the adapter base 30 onto a support surface 100, with differing underlying support structure configurations.

As shown in FIGS. 3A-4G, the adapter base 30 defines a height (measured between a bottom surface that is configured to rest against a support surface 100 and an opposite top surface). The adapter base 30 may have an at least substantially rounded edge surrounding a perimeter of the adapter base 30. The at least substantially rounded edge is configured to at least partially contour to the interior surface of the domed portion 21 of the flashing component 20. As mentioned previously, perimeter of the adapter base 30 has a shape corresponding to the shape of the domed portion 21. In the illustrated example embodiment of the figures, the adapter base 30 has a round shape. Moreover, the height of the adapter base 30 is less than an interior height of the domed portion 21 of the flashing member. Having a height less than the interior height of the domed portion 21 ensures the flashing component 20 can contour to the shape of the support surface 100, without the adapter base 30 pressing the flashing component 20 away from the support surface 100.

Figure 2B:
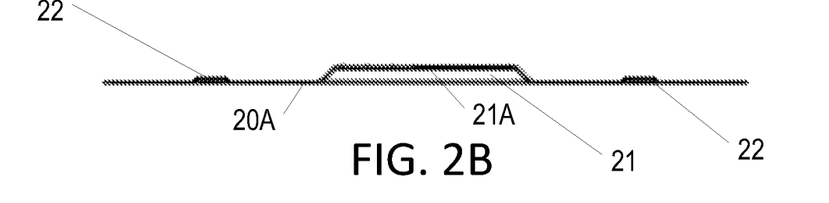

In other embodiments, the height of the adapter base 30 is greater than the height of the interior dome volume defined by the domed portion 21 of the flashing component such that a bottom surface of the adapter base 30 extends below a bottom surface of the flashing component 20 when the adapter base is inserted into the interior portion defined by the domed portion 21 of the flashing component 20. Such an embodiment ensures that the mounting foot 50, 55 is securely attached onto the adapter base 30 and securely pinches the flashing component 20 between the mounting foot 50, 55 and the adapter base 30. For clarity, the height of the interior portion defined by the domed portion 21 is measured between an upper interior surface 21A of the domed portion 21 and a bottom surface 20A of the at least partially planar portion of flashing component, as shown in FIG. 2B. The height of the adapter base 30 is measured between an upper-most surface of the adapter base 30A and a lower-most surface of the adapter base 30B (as shown in FIGS. 3A-3B). In various embodiments, one or more geometric features, such as, for example, recesses, contours, and/or the like, may be provided along the upper interior surface 21A of the domed portion 21 in order to facilitate a desired arrangement of the adapter base 30 within the interior portion defined within the domed portion 21 of the flashing component 20. For example, the upper interior surface 21A of the domed portion 21 may include one or more material recesses configured to receive a corresponding one or more protruding features of the adapter base 30 protruding from a top surface thereof in order to facilitate a contoured fit of the adapter base 30 against the upper interior surface 21A.

As illustrated in the figures, the adapter base 30 defines a plurality of apertures 31, 35 extending through the adapter base 30 parallel to a height of the adapter base 30. The adapter base 30 defines a central aperture 31 configured to receive a central fastener (e.g., fastener 41 or fastener 45), as described herein. In various embodiments, a fastener 45 received by the adapter base 30 at the central aperture 31 may be utilized to secure the adapter base 30 relative to the flashing component 20 and the mounting foot 50, 55 (e.g., a standoff component connected thereto). Separate fasteners 42 may be utilized to secure the adapter base 30 to the support surface 100 by extending through one or more peripheral apertures 35 spaced around a perimeter portion of the adapter base 30, such as, for example, proximate an outer edge of the adapter base 30. All of the peripheral apertures 35 may be spaced at an identical distance away from a center of the adapter base 30 (e.g., central aperture 31). Moreover, the peripheral apertures 35 may be spaced at least substantially equally distributed around the perimeter of the adapter base 30. In the illustrated embodiment, the adapter base 30 defines four peripheral apertures 35 spaced at 90° around the perimeter of the adapter base 30.

For example, in various embodiments, the adapter base 30 is configured such that, upon the adapter base 30 being arranged within the domed portion 21 of the flashing component 20, the central aperture 31 may be at least substantially aligned (e.g., coaxially) with the flashing aperture 25 of the flashing component 20. In various embodiments, the adapter base 30 may comprise a hexagonal recess 32 extending into the adapter base bottom surface and aligned with the central aperture 31 such that the central fastener 45 (e.g., a bolt) may be extended into the adapter base 30 from a bottom side thereof (e.g., through the adapter base bottom surface) in an at least partially upward direction into the flashing aperture 25 of the flashing component 20 while at least a portion of the adapter base bottom surface remains flat against the support surface. A fastener head 45A nests into the hexagonal recess 32. A nut 46 and washer 43 may then be secured to the exposed threads of the central fastener 45 to secure the mounting foot 50 and flashing component 20 onto the adapter base 30 (as shown in FIGS. 6-7). Alternatively, a spacer 55 may be threaded onto the exposed threads of the central fastener 45, as shown in FIGS. 8-9 (an L-shaped mounting foot 50 or other mounting foot may be threaded into an exposed end of the spacer 55 in such embodiments).

Further, in various embodiments, the adapter base 30 may comprise a stepped recess portion 33 extending at least substantially adjacent the adapter base top surface around the outer perimeter of the central aperture 31 such that an O-ring 47 may be arranged within the stepped recess portion 33 to at least substantially minimize the flow of water from the flashing component 20 through the top surface of the adapter base 30.

Further, in various embodiments, a fastener 41 may be further provided through the central aperture 31 so as to secure the adapter base 30 relative to each of the flashing component 20 (by extending through the flashing aperture 25), the mounting foot 50 (by extending through the mounting aperture 51), and the support surface 100. For example, in an exemplary circumstance wherein the support surface 100 comprises a singular attachment point, such as, for example, a rafter of a roof 101, the exemplary mounting system 10 may be mounted to the single attachment point using a fastener 41 that may be extended into a top surface of the mounting foot 50, in an at least partially downward direction, through the flashing aperture 25 of the flashing component 20 (e.g., first, into the top surface thereof and through the flashing component's bottom surface), further through the adapter base 30 provided in the domed portion 21 via a central aperture 31 aligned therewith, as described herein, and into the support surface 100. The fastener 41 may be driven into the attachment point of the support surface 100 such that the mounting foot 50, the flashing component 20, and the adapter base 30 are compressed against one another relative to the support surface 100 and a solar panel may be secured relative to the mounting foot 50 (e.g., via a rail) to secure the solar panel relative to the support surface 100.

In various embodiments, the adapter base 30 may comprise a plurality of peripheral apertures 35 extending through the thickness of the adapter base 30 and being distributed in an at least substantially even radial distribution around a perimeter portion of the adapter base 30. For example, in an exemplary configuration wherein the central aperture 31 defines a central base axis extending through the adapter base 30, the plurality of peripheral apertures 35 may comprise at least approximately between two and ten (e.g., four) apertures evenly distributed about the central base axis. In various embodiments, each of the plurality of peripheral apertures 35 of the adapter base 30 are configured to receive a respective one of a plurality of fasteners 42 configured to secure the adapter base 30 relative to the support surface 100. For example, in various embodiments, the plurality of peripheral apertures 35 may be configured to secure the adapter base 30 to one or more secondary attachment points of a support surface 100, such as, for example, a deck or a joist 102 of a roof, that may not be aligned with the central aperture 31 of the adapter base 30. For example, the adapter base 30 may be configured such that a plurality of fasteners 42 (e.g., bolts) may be extended into the respective plurality of peripheral apertures 35 from the top side of the adapter base 30 (e.g., through the top surface) in an at least partially downward direction into the support surface 100 positioned there below. In such an exemplary circumstance, each of the fasteners 42 provided through the peripheral apertures 35 of the adapter base 30 may engage one of the plurality of secondary attachment points (e.g., deck, joists 102) of the support surface 100 so as to secure the adapter base 30 relative to the support surface 100. With reference to FIGS. 4A-4G, circular shape of the adapter base 30 and the even distribution of the peripheral apertures 35 about the central base axis may enable the adapter base 30 to be selectively rotated about the central base axis prior to being attached to the support surface 100 in order to accommodate a variety of mounting configurations defined by secondary attachment points with different separation distances provided therebetween.

In various embodiments, the adapter base 30 may comprise a plurality of secondary mount recess portions 36 extending into the adapter base top surface, each being arranged aligned with a respective peripheral aperture 35 such that corresponding fasteners 42 may be extended therethrough from a top side of the adapter base 30 (e.g., through the top surface) towards the support surface 100 while at least a portion of the adapter base top surface remains flat against the bottom surface of the flashing component 20. In other words, an entire height of a head 42A of the fastener 42 remains below a top surface of the adapter base 30, with the head 42A positioned within the secondary mount recess portion 36.

Further, in various embodiments, the adapter base may comprise a plurality of secondary stepped recess portions 37 extending at least substantially adjacent the adapter base bottom surface around a respective outer perimeter of each of the peripheral apertures 35 such that an O-ring (not shown) may be arranged within each secondary stepped recess portion 37 to provide at least substantially sealed surface between the adapter base bottom surface and the support surface 100 at each of the peripheral apertures 35.

As an illustrative example, in various embodiments, the central fastener 45 may be provided through the central aperture 31 in a substantially upward direction and through the flashing aperture 25 so as to secure the mounting foot (L-shaped adapter base 50 and/or spacer 55) relative to the flashing component 20 and the adapter base 30, while each of a plurality of secondary fasteners 42 are provided through a respective one of the plurality of peripheral apertures 35 of the adapter base 30 in a substantially downward direction so as to secure the adapter base 30 relative to the support surface 100 (e.g., at plurality of attachment points provided along the support surface 100). For example, an exemplary circumstance wherein the support surface 100 comprises a first attachment point and a second attachment point separated from the first attachment point by a lateral separation distance, such as, for example, a deck or a joist 102 of a roof, the exemplary mounting system 10 may be configured to be mounted to the support surface 100 at each of the first and second attachment points using a respective secondary fastener 42 that may be extended into a top surface of the adapter base 30, in an at least partially downward direction into the attachment points. Further, a central fastener 45 of the mounting system 10 may be provided through the central aperture 31 in an at least partially upward direction, further through the flashing aperture 25 of the flashing component 20 aligned therewith, as described herein, and into the mounting foot 50, 55 such that the mounting foot 50, 55, the flashing component 20, and the adapter base 30 are compressed against one another relative to the support surface 100.

Figure 4A:
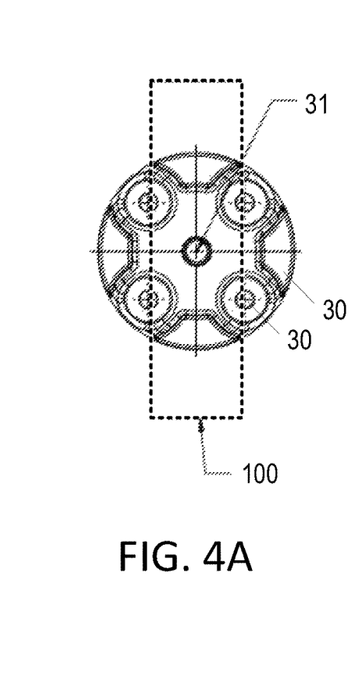
FIGS. 4A-4G are schematic illustrations of mounting the solar panel mounting system onto a support surface.
Figure 4B:
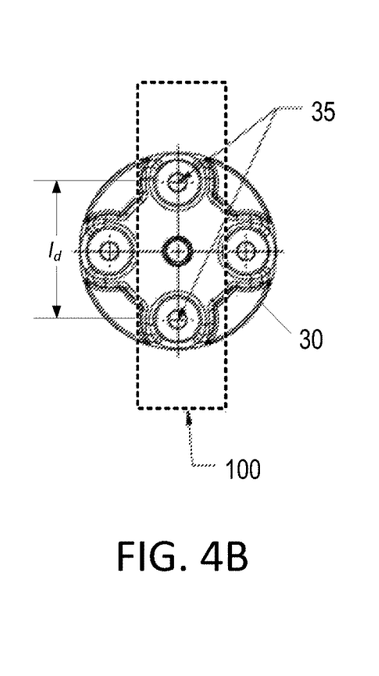
Figure 4C:
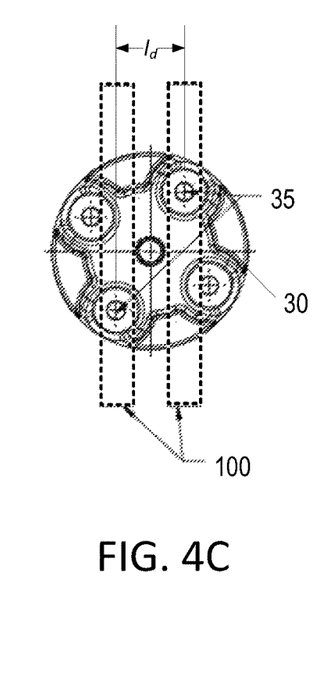
Figure 4D:
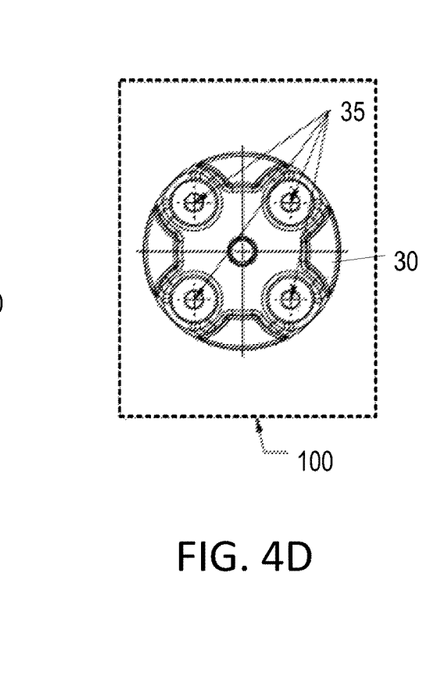
Figure 4E:
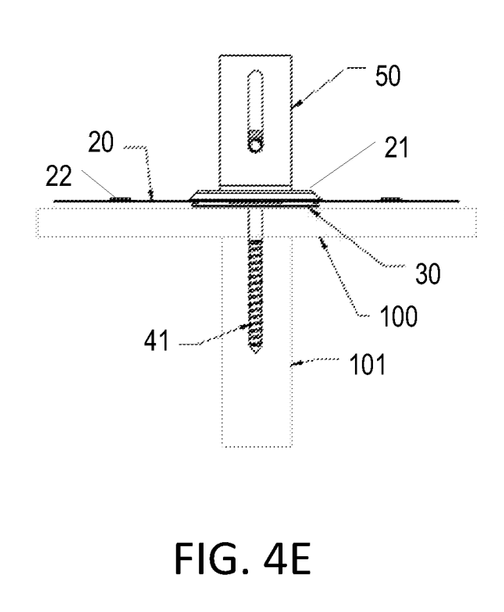
Figure 4F:
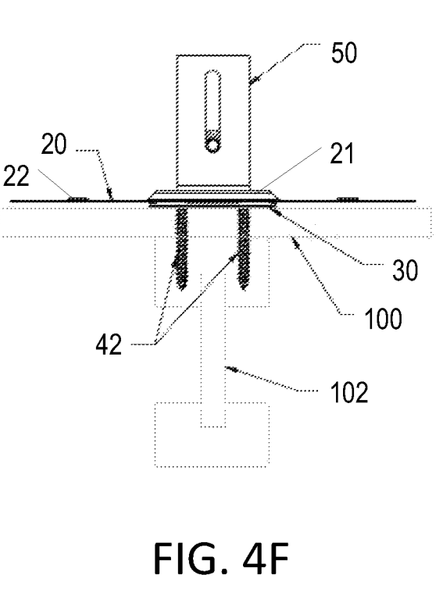
Figure 4G:
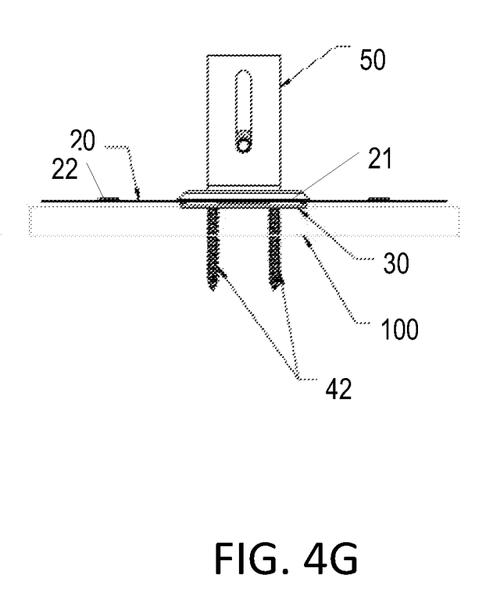
Figure 5:
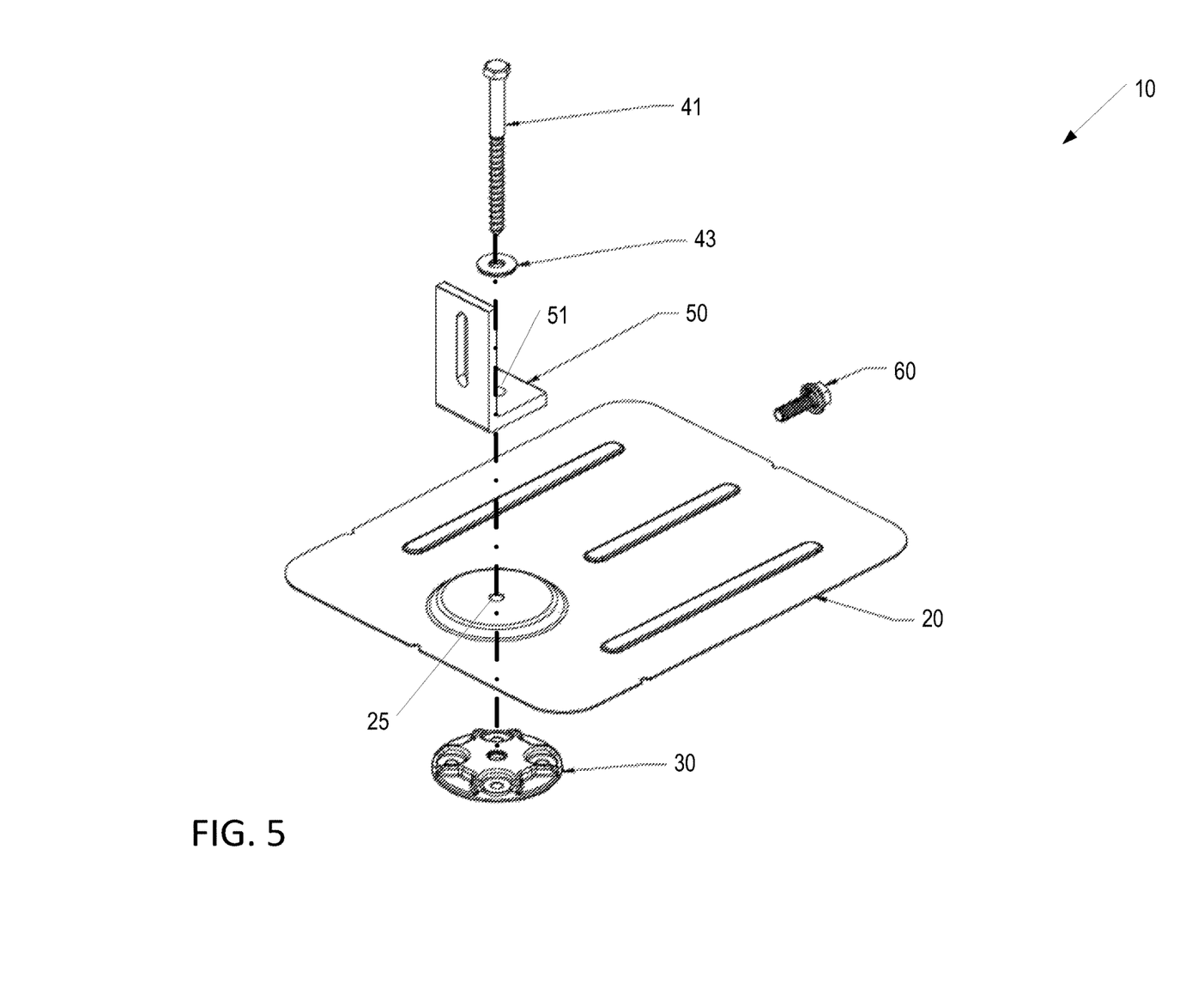
FIG. 5 shows an exploded view of the solar panel mounting system of FIG. 1.

Each of a plurality of example mounting configurations are illustrated in FIGS. 4A-4G. As shown in FIGS. 4A and 4E, where the center aperture 31 of an exemplary adapter base 30 is aligned with a supportive underlying support structure (e.g., a solid truss 101) of a support surface 100, a single, centralized fastener (e.g., central fastener 41) may be utilized to secure all of the components of the mounting system 10, such as, for example, the mounting foot 50, the flashing component 20, the adapter base 30, and/or the like) onto the support surface 100. Alternatively, two secondary fasteners (e.g., non-centralized fasteners) may be used to secure the adapter base 30 relative to such a centrally located supportive underlying structure of a support surface 100, as illustrated in FIG. 4B. Specifically, fasteners 42 may be placed through respective peripheral apertures 35 on opposite sides of the support base 30 (in the illustration of FIG. 4B, fasteners 42 may extend through the two peripheral apertures that are explicitly labeled) to secure the adapter base 30 to the support surface 100 at one or more non-centralized attachment points (e.g., a solid truss 101). In such an exemplary configuration, a separate fastener 45 may be utilized to secure the adapter base 30 relative to the flashing member 20 and the mounting foot 50, 55. With reference to FIGS. 4C and 4F, one or more secondary fasteners 42 may be placed through peripheral apertures 35 on opposite sides of a support base 30 (in the illustration of FIG. 4C, one or more secondary fasteners may extend through the two peripheral apertures that are explicitly labeled; note the adapter base 30 is rotated to adjust the lateral distance between the peripheral apertures 35 utilized to secure adapter base 30 relative to the support surface so as to bracket an unsupportive center portion of the underlying support structure shown in FIG. 4F). Again, a separate fastener 45 may be utilized to secure the adapter base 30 relative to the flashing member 20 and the mounting foot 50, 55. As shown in FIG. 4D and FIG. 4G, one or more secondary fasteners 42 may extend through all of the peripheral apertures 35 in the event that the adapter base 30 is to be secured to a support surface 30 where there is in sufficient underlying support structure. Again, a separate fastener 45 may be utilized to secure the adapter base 30 relative to the flashing member 20 and the mounting foot 50, 55.

As additional explanation of the exemplary embodiments illustrated in FIGS. 4B-4D, note the lateral distance between used peripheral apertures 35 (those peripheral apertures 35 aligned with one or more non-centralized support structure (s) of the support surface that are used to secure the adapter base 30 relative to a support surface 100) may be adjusted as needed by rotating the adapter base 30 within the domed portion 21 of the flashing component 20. As shown in FIG. 4B, where a single underlying support structure is used to support the adapter base 30, a maximum lateral distance between used peripheral apertures may be selected, by at least substantially aligning peripheral apertures 35 on opposite sides of the adapter base 30 with a longitudinal axis of the underlying support structure (e.g., a truss 102). By rotating the adapter base 30 relative to flashing component 20, the lateral distance between used peripheral apertures 35 may be decreased, as reflected in FIG. 4C. As shown in FIG. 4C, the used peripheral apertures 35 are positioned so as to bracket a weaker center portion of a joist 102, while still aligning with stronger portions of the same joist 102. The lateral distance between used peripheral apertures 35 is shown as $l_d$ in FIG. 4C.

The exemplary solar panel mounting configuration may be used with other exemplary solar panel mounting configurations, such as those described in co-pending U.S. application Ser. No. 16/215,266, filed Dec. 10, 2018, and U.S. application Ser. No. 16/117,813, filed Aug. 30, 2018, each of which is incorporated herein by reference in its entirety.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A solar panel mounting system comprising:
   a flashing component configured to at least partially contour to a support surface, wherein the flashing component is a panel comprising:
   a domed portion defining an open interior accessible via a lower surface of the panel, wherein the open interior has an interior height measured between the lower surface of the panel and an upper most interior surface of the domed portion; and
   a flashing aperture extending through a center of the domed portion;
   an adapter base having a circular shape and positioned within the open interior of the domed portion, wherein at least a portion of a top surface of the adapter base is pressed against the upper most interior surface of the domed portion, wherein the adapter base has a base height greater than the interior height, and wherein the adapter base defines:
   a central aperture extending at least substantially parallel to the base height, wherein the central aperture is at least substantially aligned with the flashing aperture;
   a plurality of peripheral apertures each extending at least substantially parallel to the base height; and
   an edge surrounding a perimeter of the adapter base, wherein the edge is configured to contour to an interior perimeter of the domed portion; and
   a mounting foot having at least one mounting aperture configured to accept a fastener such that the fastener extends through the at least one mounting aperture of the mounting foot, the flashing aperture of the flashing component, and the central aperture of the adapter base, wherein the mounting foot is configured to secure a solar system to the support surface.

2. The solar panel mounting system of claim 1, wherein the panel additionally defines one or more raised stiffening ribs.

3. The solar panel mounting system of claim 1, wherein the panel additionally defines one or more alignment notches within a perimeter edge of the panel.

4. The solar panel mounting system of claim 1, wherein the plurality of peripheral apertures comprise four peripheral apertures spaced equally around the perimeter of the adapter base.

5. The solar panel mounting system of claim 1, wherein the adapter base further defines a bottom surface and a hexagonal recess aligned with the central aperture.

6. The solar panel mounting system of claim 5, wherein the adapter base further defines a circular recess within the top surface of the adapter base and surrounding the central aperture, wherein the circular recess is configured to accept an O-ring therein.

7. The solar panel mounting system of claim 5, wherein the fastener is a first fastener having a first fastener head positioned within the hexagonal recess, and wherein the solar panel mounting system additionally comprises a plurality of second fasteners extending through one or more of the plurality of peripheral apertures to secure the adapter base onto the support surface.

8. The solar panel mounting system of claim 7, wherein the adapter base defines a secondary recess in the top surface surrounding each of the plurality of peripheral apertures, and wherein each of the plurality of second fasteners have second fastener heads positioned within the secondary recess surrounding each of the one or more of the plurality of peripheral apertures.

9. The solar panel mounting system of claim 1, wherein the mounting foot is an L-shaped foot.

10. The solar panel mounting system of claim 1, wherein the mounting foot is a tubular standoff.

11. The solar panel mounting system of claim 10, wherein the at least one mounting aperture of the mounting foot is threaded.

12. The solar panel mounting system of claim 1, wherein the flashing component is aluminum.

13. The solar panel mounting system of claim 1, wherein the adapter base is aluminum.

* * * * *